US009460277B2

(12) United States Patent
Bolik et al.

(10) Patent No.: US 9,460,277 B2
(45) Date of Patent: Oct. 4, 2016

(54) IDENTITY BASED AUDITING IN A MULTI-PRODUCT ENVIRONMENT

(75) Inventors: Christian Bolik, Boeblingen (DE); Neeta Garimella, San Jose, CA (US); Jayashree Ramanathan, Round Rock, TX (US); Markus Rohwedder, Boeblingen (DE); Zhiguo Huang, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 12/960,866

(22) Filed: Dec. 6, 2010

(65) Prior Publication Data

US 2012/0144453 A1  Jun. 7, 2012

(51) Int. Cl.
*G06F 21/00* (2013.01)
*G06F 21/31* (2013.01)

(52) U.S. Cl.
CPC ....... *G06F 21/31* (2013.01); *G06F 2221/2101* (2013.01)

(58) Field of Classification Search
CPC .................... G06F 21/31; G06F 2221/2101
USPC .............................................................. 726/4
See application file for complete search history.

(56) References Cited

U.S. PATENT DOCUMENTS 6,993,790 B2 *  1/2006  Godwin et al. ................ 726/4
2004/0128169 A1 *  7/2004  Lusen .............................. 705/3

(Continued)

FOREIGN PATENT DOCUMENTS

| WO | WO2004006073 | 1/2004 |
|---|---|---|
| WO | WO2005069823 | 8/2005 |
| WO | WO2009010718 | 1/2009 |

OTHER PUBLICATIONS

Huemer, D.; Tjoa, A.M.; Descher, M.; Feilhauer, T.; Masser, P.; , "Towards a Side Access Free Data Grid Resource by Means of Infrastructure Clouds," Parallel Processing Workshops, 2009. ICPPW '09. International Conference on , vol., No., pp. 198-205, Sep. 22-25, 2009.*

(Continued)

*Primary Examiner* — Syed Zaidi
(74) *Attorney, Agent, or Firm* — Richard A. Wilhelm; David H. Judson

(57) ABSTRACT

An identity of a user performing an operation with respect to an application is propagated, from a point at which the user authenticates, to one or more other applications in a multi-product environment. The application may be a management console associated with an information cluster. In an embodiment, an administrator logs on to a management console (using an identity) and invokes a management operation. The management console then performs a programmatic remote access login (e.g., using SSH/RXA) to one or more nodes using a system account, invokes an application, and passes in the identity. As the application performs one or more management operations, audit events are logged, and these events each contain the identity that has been passed in by the management console during the SSH/RXA login. The technique thus provides a method for identity-based auditing in an environment having a plurality of applications, where each application typically has a respective authentication process or mechanism and distinct identity registries.

24 Claims, 7 Drawing Sheets

(56) References Cited

U.S. PATENT DOCUMENTS

| | | | |
|---|---|---|---|
| 2004/0133797 A1* | 7/2004 | Arnold | 713/200 |
| 2004/0172558 A1* | 9/2004 | Callahan et al. | 713/201 |
| 2005/0048924 A1* | 3/2005 | Nelson et al. | 455/67.11 |
| 2005/0108709 A1* | 5/2005 | Sciandra et al. | 718/1 |
| 2005/0144095 A1* | 6/2005 | Scruton et al. | 705/30 |
| 2006/0005234 A1* | 1/2006 | Birk et al. | 726/9 |
| 2007/0118534 A1* | 5/2007 | Hayes et al. | 707/10 |
| 2007/0124820 A1* | 5/2007 | Burch et al. | 726/26 |
| 2007/0233600 A1* | 10/2007 | McMahon | 705/51 |
| 2008/0184349 A1* | 7/2008 | Ting | 726/7 |
| 2009/0297043 A1 | 12/2009 | Hinton et al. | |
| 2010/0058291 A1 | 3/2010 | Hahn et al. | |
| 2010/0115284 A1 | 5/2010 | Hahn et al. | |

OTHER PUBLICATIONS

An Qin, Haiyan Yu, Chengchun Shu, and Bing Xu. 2008. XOS-SSH: a lightweight user-centric tool to support remote execution in virtual organizations. In First USENIX Workshop on Large-Scale Computing (LASCO'08). USENIX Association, Berkeley, CA, USA, Article 1 , 10 pages.*

Kandaswamy, G.; Fang, L.; Huang, Y.; Shirasuna, S.; Marru, S.; Gannon, D.; , "Building web services for scientific grid applications," IBM Journal of Research and Development , vol. 50, No. 2.3, pp. 249-260, Mar. 2006.*

Song Wu; Wei Zhu; Wenbin Jiang; Hai Jin; , "VMGrid: A Virtual Machine supported grid middleware," Granular Computing, 2008. GrC 2008. IEEE International Conference on , vol., No., pp. 676-679, Aug. 26-28, 2008.*

* cited by examiner

```
default - SSH Secure Shell
Quick Connect  Profiles
File Edit View Window Help ianode1:/tiam/COLL1/utility/raw_logs ≠ ls
172.31.1.1.rawlog 172.31.1.1.rawlog.1 172.31.1.1.rawlog.1.limbo
ianode1:/tiam/COLL1/utility/raw_logs ≠ grep John *
172.31.1.1.rawlog:type=USER mag=audit(1285368796.234:3544): user pid=26615 uid=0 auid=4294967295
mag="type=IAM_EVENT_EXT_ATTRIBUTE_MODIFY component=ui colmnt=/tiam/COLL1
nodeid=172.31.1.1 uid=John result=ok enabled=false indexLevel=5 indexMode=indexandsearch:
exe="/opt/tivoli/tiam/bin/iam_log_insert" (hostname=?, addr=?, terminal=?, re
s=success)
ianode1:/tiam/COLL1/utility/raw_logs ≠ ☐

Connected to   SSH2-aes128-cbc-hmac-md5-none   169x15   NUM
```

FIG. 9

IDENTITY BASED AUDITING IN A MULTI-PRODUCT ENVIRONMENT

BACKGROUND OF THE INVENTION

1. Technical Field

This disclosure relates generally to software components used in a multi-product distributed computing environment, where such components produce audit logs for various management operations, and such logs are used for the purposes of compliance analysis, problem determination, and forensics, among others.

2. Background of the Related Art

Certain computing systems are known to generate and store a log of records that are used for auditing system functions and activities. In particular, each audit record captures information related to a corresponding event of interest to the computing system. Depending upon the particular implementation, an event of interest may comprise a positive action or a negative action (or lack of action when an action is anticipated) that is to be audited. As a few illustrative examples, an audit record may capture information identifying the status and/or performance of a particular transaction or transaction type, the execution (or lack thereof) of a system process or the occurrence of an activity or state within the system or component(s) thereof. Each audit record may also capture information such as the identity of the person or process that triggered the event, a time stamp corresponding to the event and/or other relevant information associated with the occurrence of the corresponding event itself. Moreover, the organization of the audit records into a corresponding audit log typically preserves the chronological order of the recorded events.

In general terms, the log of audit records allows an administrator to determine who has done what on which system component(s), application(s), etc., and when the audit generating activity occurred.

Identity-based auditing, however, is difficult in the context of a "multi-product" software solution that comprises several existing products or applications, where each product or application has its own respective authentication mechanism and identity registry. In this context, an operation performed by a user may span several of these products, and it may be important (e.g., from an accounting, security or compliance point of view) to audit the actual identity of the user in all of the products affected by the operation. An existing approach to this problem involves mapping of identities at the boundary between individual products, and then capturing this mapping in the audit records. With this approach, however, the determination of the actual user who performed the operation requires mining of these mapped audit records, which is complex, costly and inefficient.

BRIEF SUMMARY OF THE INVENTION

The subject disclosure is implemented within a multiple application environment. According to this disclosure, an identity of a user performing an operation with respect to an application is propagated, from a point at which the user authenticates, to one or more other applications in the environment. As a consequence, audit records generated by each of these applications then contain the identity.

In an illustrative embodiment, an administrator logs on to a management console (using an identity) and invokes a management operation. The management console then performs a programmatic remote access login (e.g., using SSH/RXA) to one or more nodes using a system account, invokes an application, and passes in the identity. As the application performs one or more management operations, audit events are logged, and these events each contain the identity that has been passed in by the management console during the SSH/RXA login. The described technique thus provides a method for identity-based auditing in an environment having a plurality of applications, where each application typically has a respective authentication process or mechanism and distinct identity registries.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 9 shows a resulting log entry generated as a result of the administrator operation.

DETAILED DESCRIPTION OF AN ILLUSTRATIVE EMBODIMENT

Figure 1:
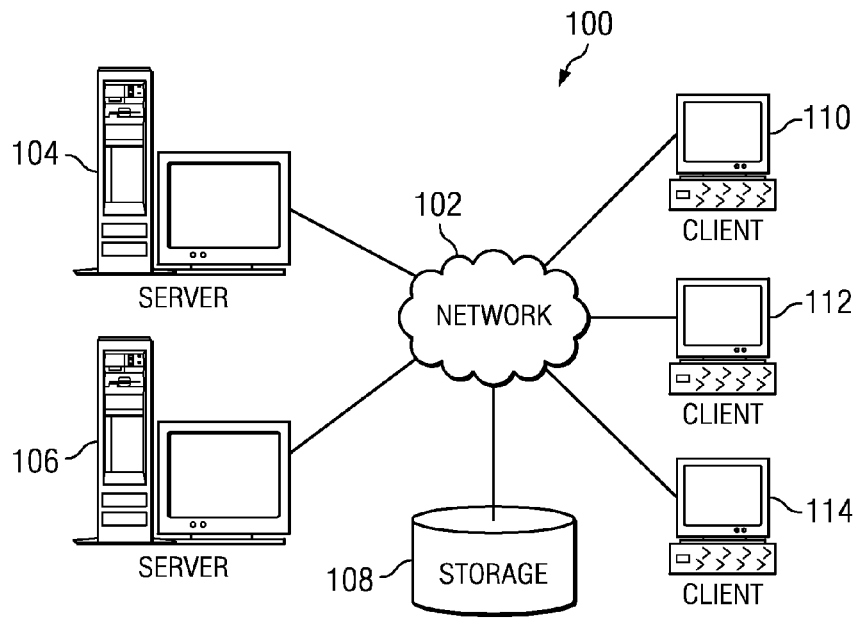
FIG. 1 depicts an exemplary block diagram of a distributed data processing environment in which exemplary aspects of the illustrative embodiments may be implemented.
Figure 2:
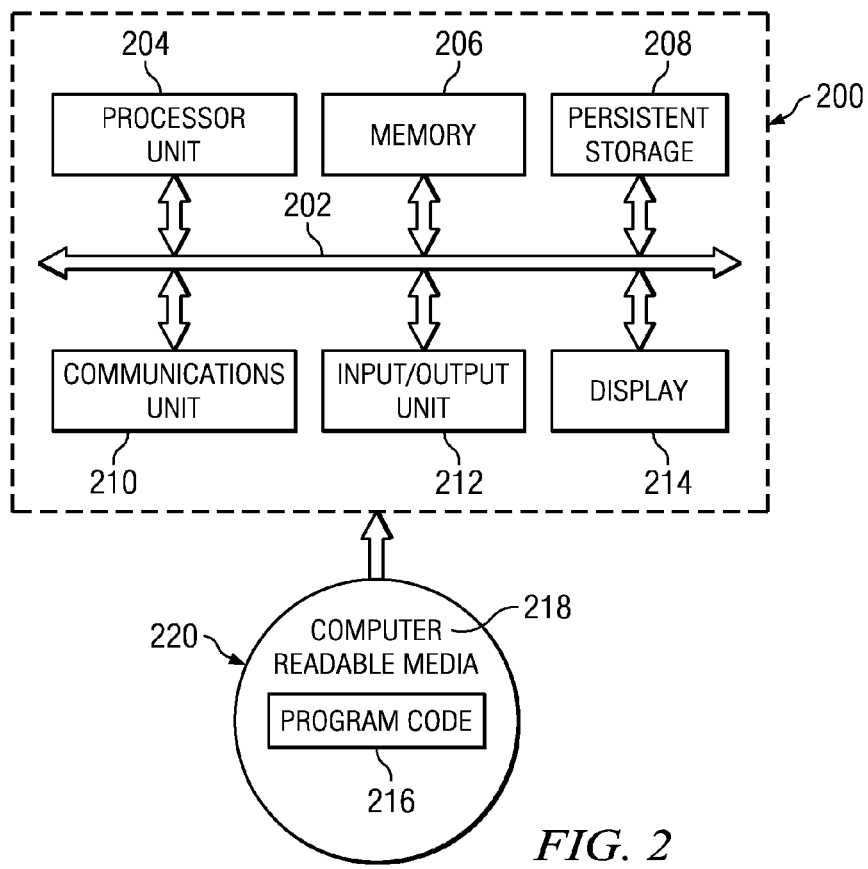
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

A distributed data processing system such as described and illustrated above typically comprises many software applications and utilities. One such solution is IBM® Information Archive, an information retention solution designed as an archiving repository to help enterprises complete information retention needs, whether business, legal or regulatory. This solution stores information in one or more data "collections." Each collection within the archive maintains a set of tamper-protected audit logs, which logs provide an immutable and retention-protected provenance record for documents in the collection. Audit logs track document ownership and system lifecycle events including, without limitation, document creation and deletion, changes to retention policies, and system software upgrades.

Figure 3:
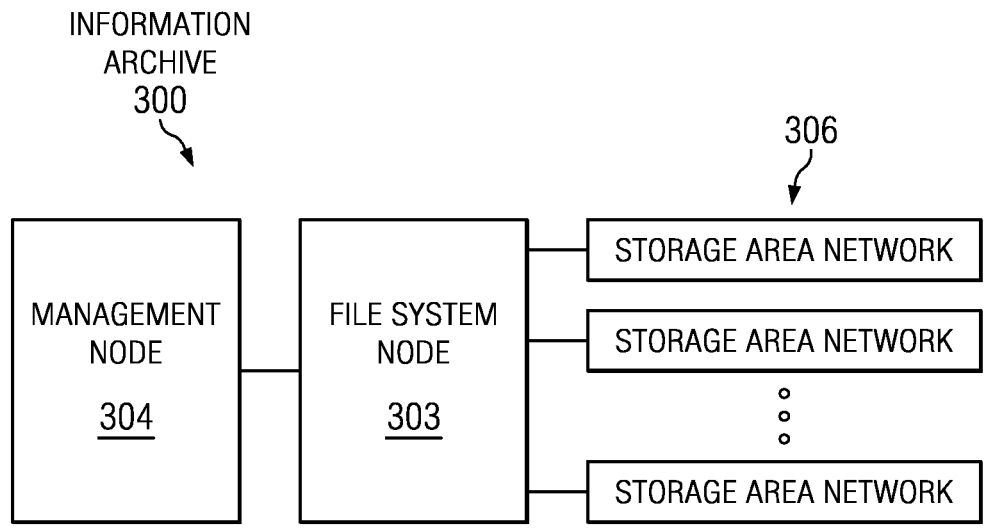
FIG. 3 is an exemplary block diagram of an information archive in which the technique of this disclosure may be implemented.

As illustrated in FIG. 3, the Information Archive 300 comprises a number of nodes. A file system node 302 provides general ingest functions through which documents are added to a file archive collection. When a document is added, retention policies and system metadata are applied and an audit log entry is written. Documents are automatically ingested after they are committed to the collection file system. A management node 304 provides management functionality, such as setting retention polices. The management node 304 provides a web-based graphical user interface (GUI) archive management console or command line interface (CLI). The management console is used by an administrator (or other authorized person or entity) to configure, administer and manage the information archive and its resources. The collections themselves are stored in a storage area network (SAN) comprising a set of cluster nodes 306 with associated controllers (not shown). The cluster nodes typically are interconnected across a back-end (private) Ethernet-based switch. The cluster nodes provide cluster archive services.

Figure 4:
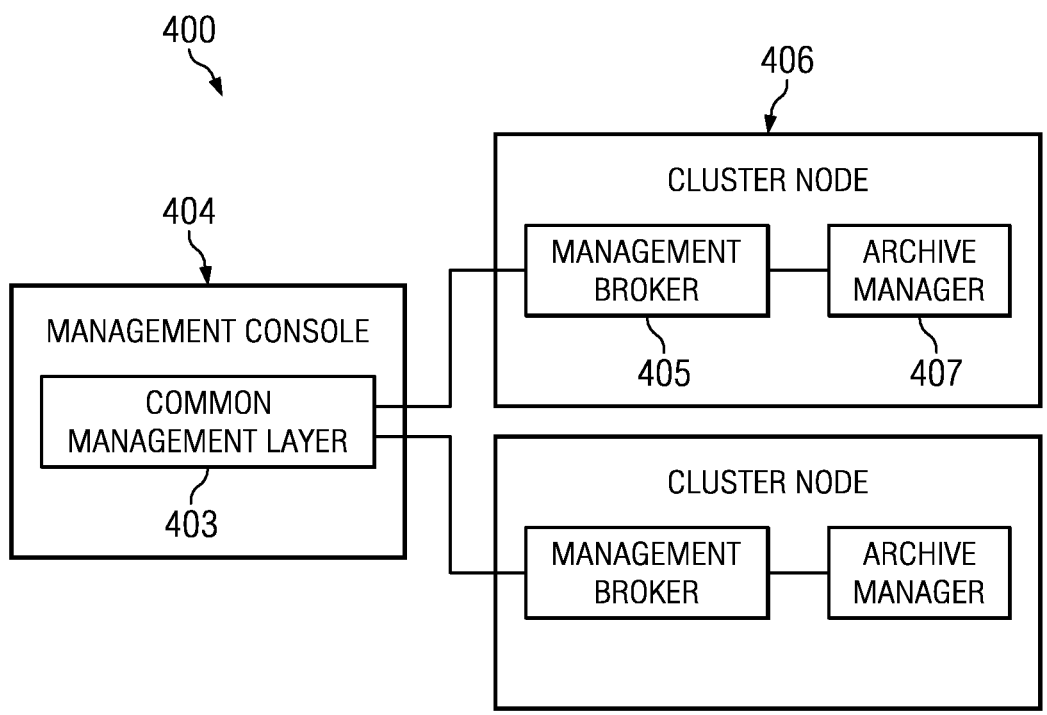
FIG. 4 is a block diagram illustrating an identity-based auditing scheme within a multi-product environment according to this disclosure.

FIG. 4 illustrates a simplified block diagram of an identity-based auditing scheme in a multi-product environment according to the teachings in this disclosure. As used herein, the environment is considered to be a "multi-product" environment because at least two or more of the applications perform identity-based auditing but use different identity registries. Typically, this means that an application within the environment uses a respective authentication process that differs from an authentication process used by another application.

This scheme is described in the context of the information archive 400, as was described above, and, in particular, within an archive that implements a multi-product solution. An administrator authenticates to the cluster in a known manner and initiates a management operation. According to this disclosure, the management console 404 includes a common management layer 403 that responds to an authenticated administrator invoking the management operation at the console to cause the management layer 403 to perform an SSH- or RXA-based login request to a management broker 405 executing in at least one cluster node 406. Using the SSH/RXA (Secure Shell/Remote Execution and Access) login, the management layer authenticates as a "system account" user to invoke the management broker 405 in the cluster node 406, passing in an identity associated with the authenticated administrator. The identity is sometimes referred to herein as an originating user identifier (ID) because it identifies the administrator who originates the management operation. Referring back to FIG. 4, the management broker 405 then invokes an archive manager 407 in the cluster node 406, passing in the identity. This operation can be bypassed if the management broker can perform the local management activity itself.

According to a feature of this disclosure, the passed-in identity (of the authenticated administrator who originally logged into the management console 404) is then used when logging audit events so that the actual user who invokes the management operation (at the console) is logged at each cluster node (and, in particular, at each application). Each of the audit records associated with a cluster node then includes the identity of the user. Later, when it is desired to review audit data at or from the management console, the identity is used to retrieve audit data from each of the cluster nodes. The management console then presents that audit data, preferably via a GUI or other interface.

Thus, according to this disclosure, the audit logs for events occurring in a multi-product environment are correlated by an identity (an originating user identifier).

Although the subject matter has been described above in the context of an archive, this is not a limitation, as the described technique may be used in any system in which a multi-product solution is implemented.

Figure 5:
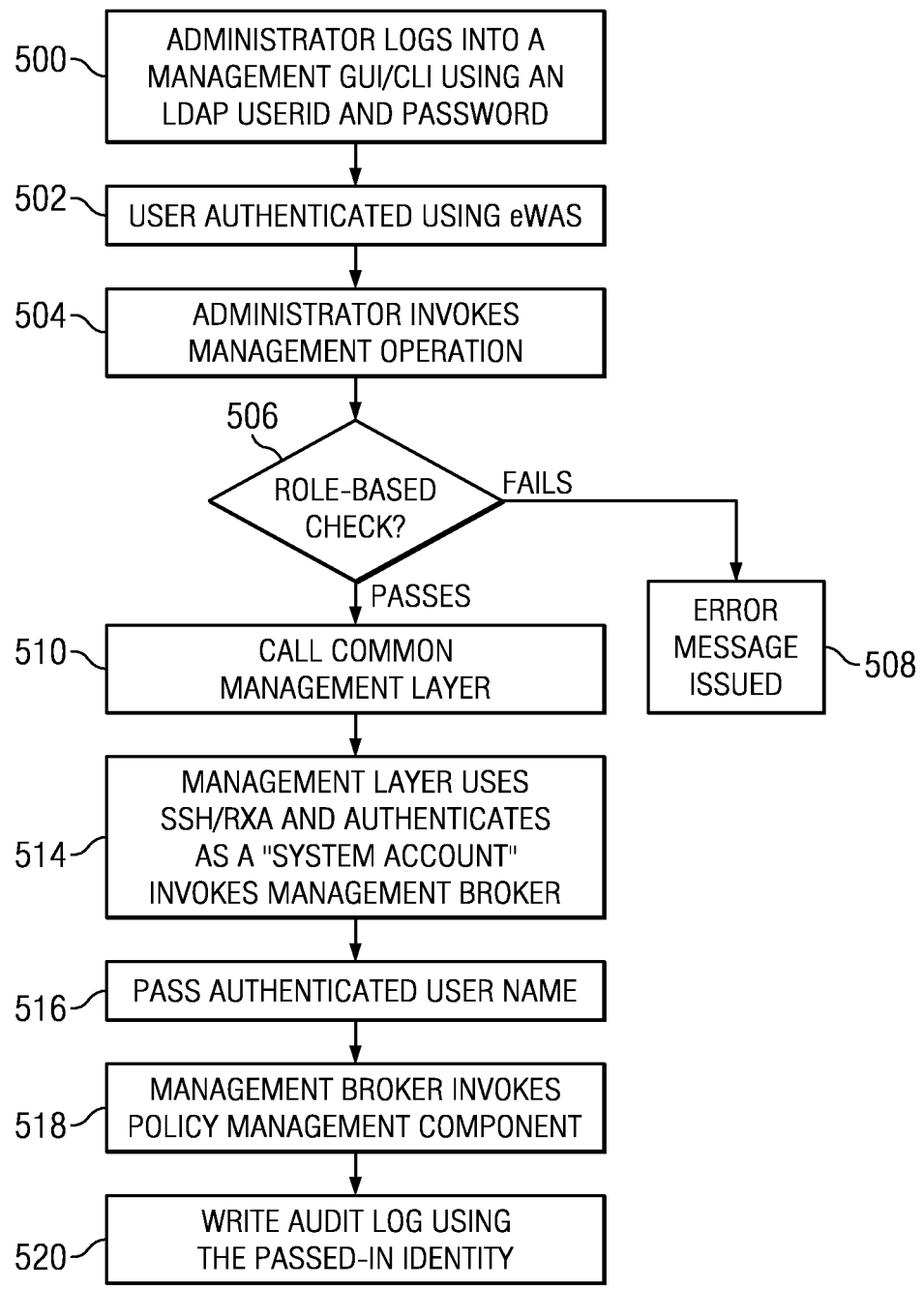
FIG. 5 is a process flow diagram illustrating a workflow for securing a management operation within an Information Archive (IA) according to this disclosure.
Figure 6:
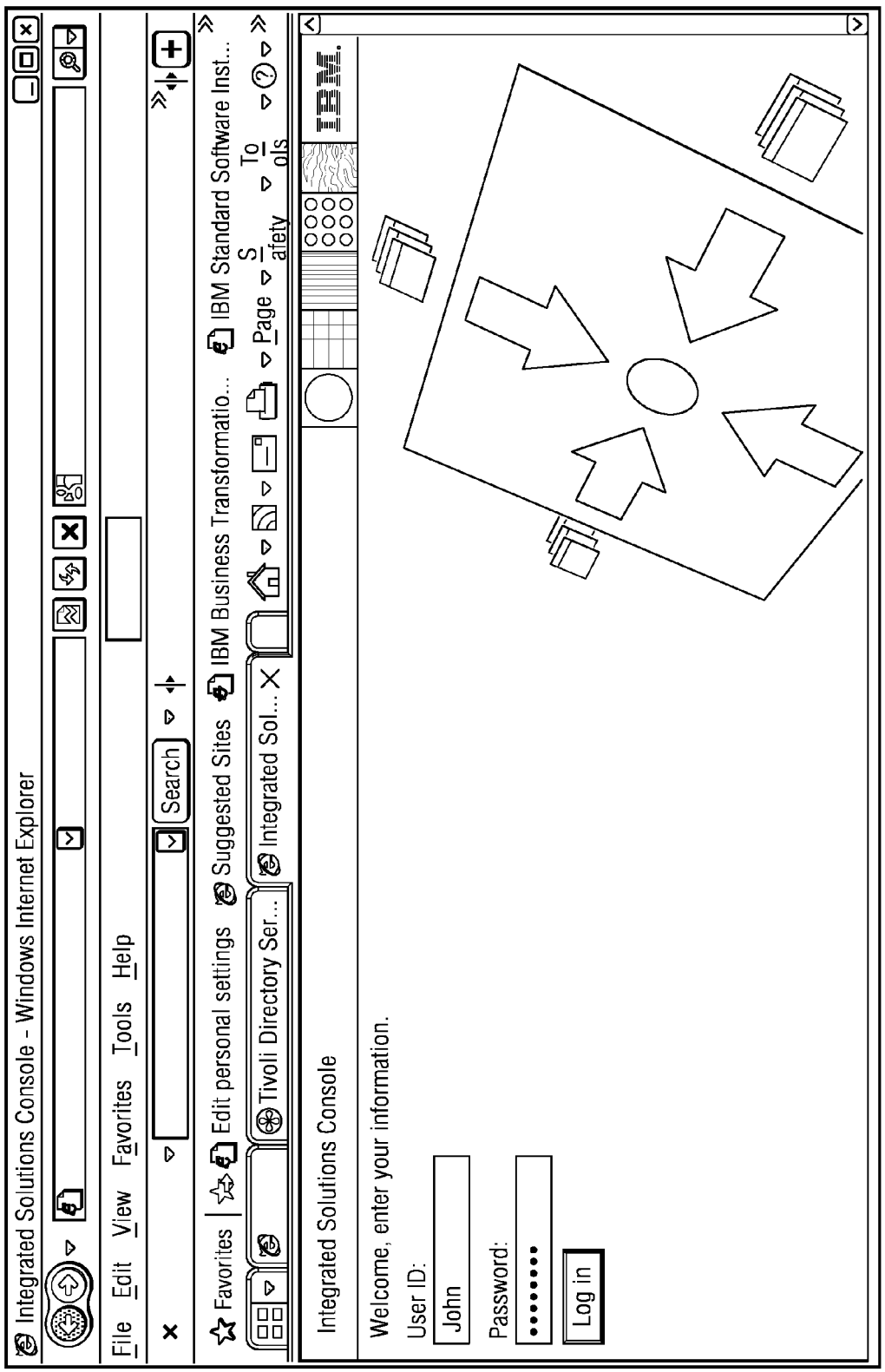
FIG. 6 is a representative display screen showing administrator (user "John") logging into an information archive (IA) administrator console web interface.
Figure 7:
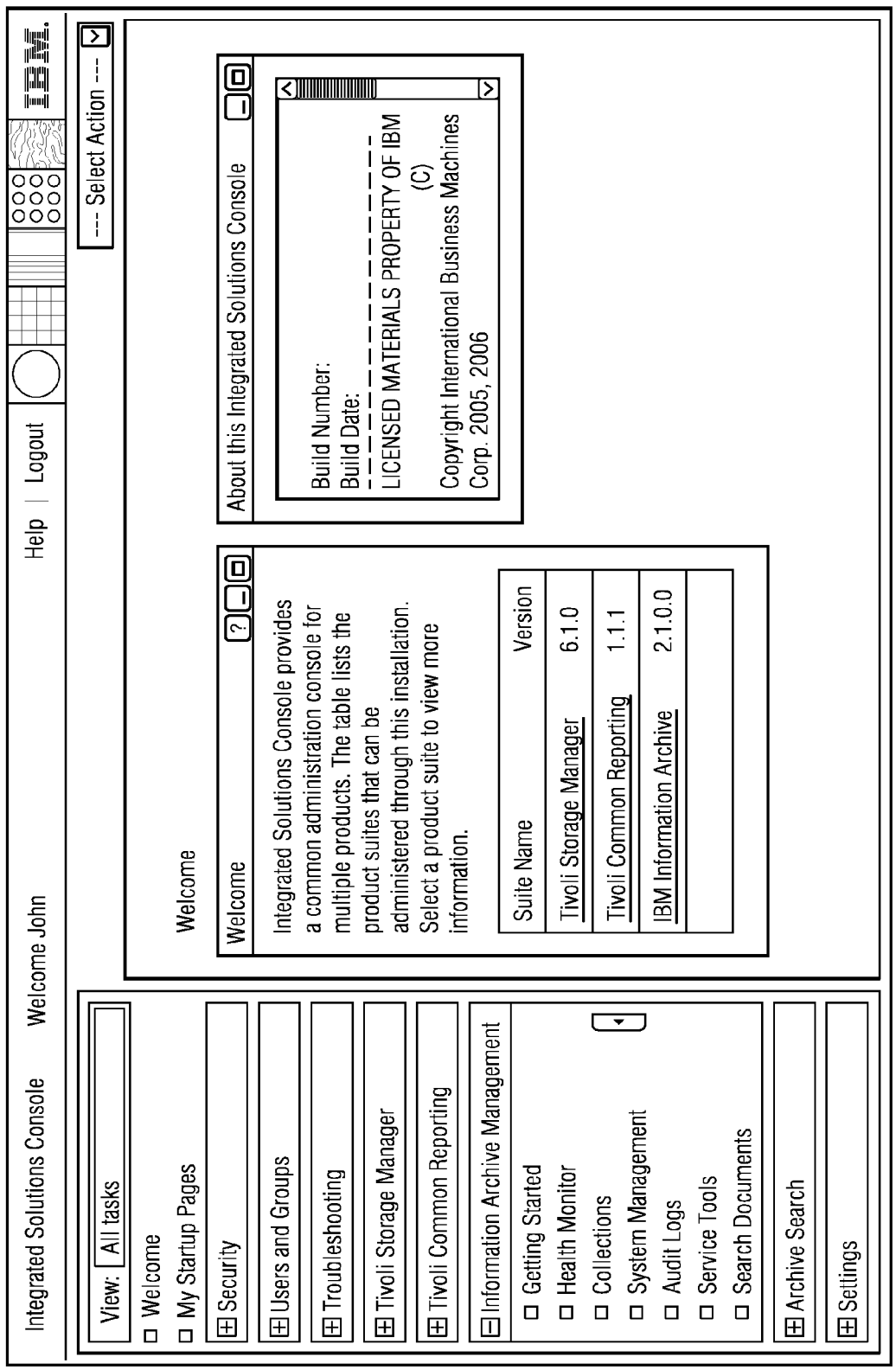
FIG. 7 shows the administrator console page after the administrator has successfully logged into the console.
Figure 8:
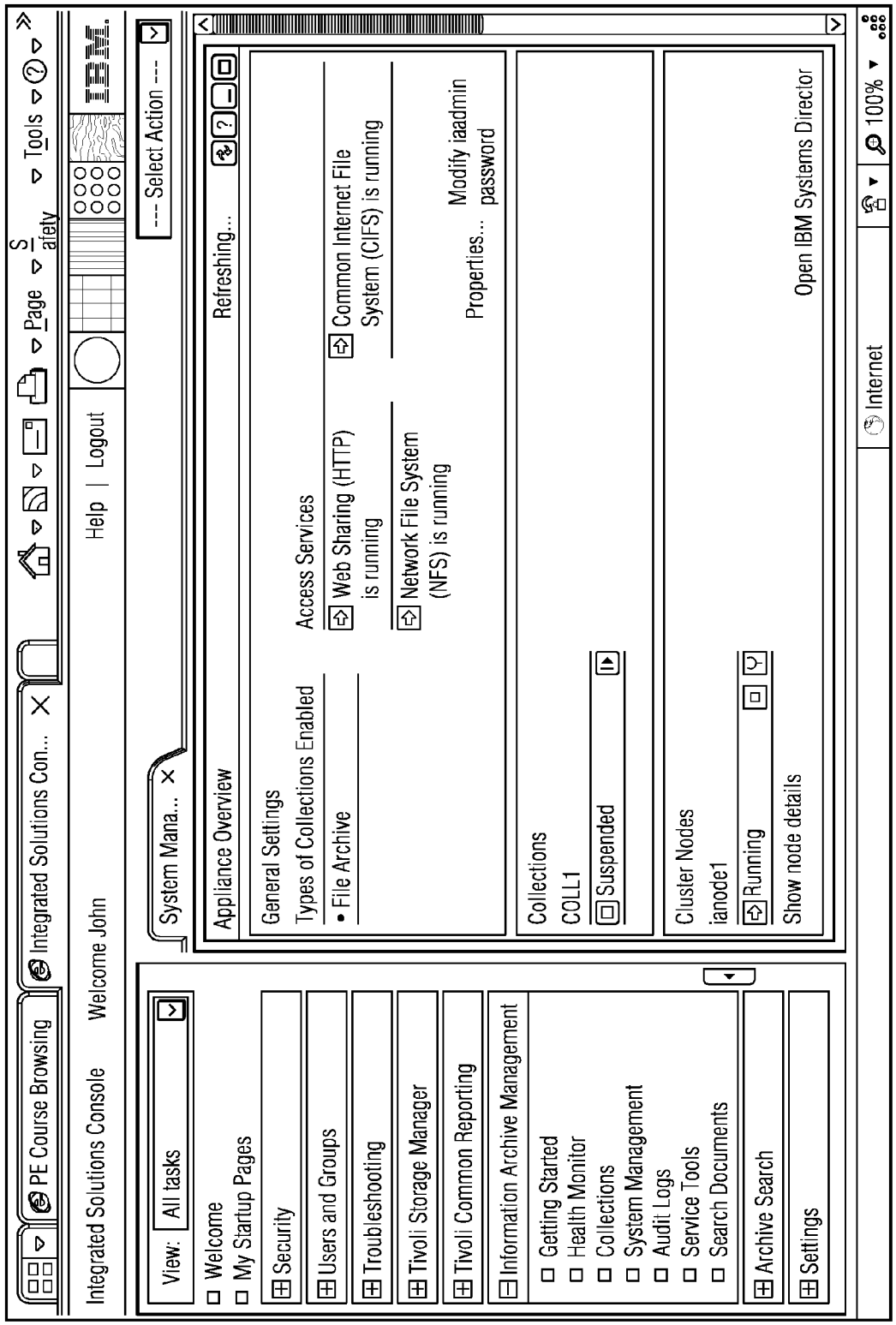
FIG. 8 shows the administrator performing a suspend operation on a data collection.

FIG. 5 is a process flow diagram of a preferred embodiment. This flow takes place within the context of an archive having a management console, as described below. A commercial product that provides this functionality is Information Archive, available from IBM. IBM Information Archive (IA) may be associated with an enterprise portal, such as the Tivoli Enterprise Portal Server (TEPS), which includes an authentication application server sub-component known as WebSphere® Express 6.1 (eWAS). These commercial products and systems are merely exemplary, as the techniques described herein may be implemented within or across any multi-product environment. The process begins at step 500 when an archive administrator logs into a management GUI/CLI (graphical user interface/command line interface) using his or her LDAP userid and password. FIG. 6 illustrates a display panel that can be used for this purpose. At step 502, the administrator is authenticated using the eWAS subcomponent. FIG. 7 illustrates a management system console display screen that is displayed to the user at this stage. The screen includes an Information Archive Management function through which the administrator can perform various monitoring, provisioning, management, auditing and related functions. At step 504, the administrator invokes a management operation, e.g., a suspend operation on a data collection. FIG. 8 illustrates a display screen by which the administrator performs this operation. At step 506, a role-based authorization check is performed to determine if the operation has been authorized for the archive administrator role. The role-based authorization check may be performed by eWAS, or it may be a native functionality associated with the console itself. If the check fails, the user receives an error message. This is step 508. If, however, the role-based authorization check passes, the process continues at step 510.

At this step, and as described above, the management console (or the CLI) calls a common management layer. Preferably, common management layer then uses SSH/RXA and authenticates as a "system account" user to invoke the management broker in the cluster. This is step 514. At step 516, the authenticated user IA user name is passed with this request.

The routine then continues at step 518 with the management broker invoking a policy management component, passing in the IA authenticated user information. The policy manager then carries out the management operation. At step 520, a log is written, using the passed-in IA user who originally logged in to the management console. FIG. 9 shows a resulting log entry generated as a result of the administrator operation. As can be seen, the passed-in IA user "John" is used when logging audit events so that the actual user who invokes the management operation is logged across the multi-product environment.

Thus, according to the disclosure, an administrator logs on to a management console (using an identity) and invokes a management operation. The management console then performs an SSH/RXA login to one or more nodes using a system account, invokes an application, and passes in the identity. As the application performs one or more management operations, audit events are logged, and these events each contain the identity that has been passed in by the management console during the SSH/RXA login.

The described technique thus provides a method for identity-based auditing in an environment having a plurality of applications, where each application typically has a respective authentication process or mechanism. According to this disclosure, when a user authenticates to a management console, accounts are automatically created in one or more other applications in the multi-application environment. The identity of the authenticated user is propagated so that this identity is captured in the audit logs of the invoked component even though that component executes as a "system identity." Preferably, and as described above, the user's user ID name and numeric uid are used to uniquely identify (across all or substantially all solution components) the user who triggers or performs a certain operation. Advantageously, when a management operation (e.g., a configuration change) is triggered through an administration portal, the identity of the user performing the change is captured in high-level audit logs and is also passed to the component executing the request.

When a new user accesses the solution through the administrative portal, a new ID is automatically generated for the user if that user has an appropriate authorization level. As a consequence, activity logs will show the name of the user who performed a configuration change or other activity. Also, in case of file level access through standard protocols (such as NFS or HTTP), the numeric user id of the user is captured in an audit log to allow for a detailed audit trail down to individual file operations, precisely identifying the user who performed the operation.

As also noted, according to another aspect of this disclosure, access to the multi-product audit trail preferably occurs through the management console by an authenticated user that holds an auditor role.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

The invention claimed is:

1. A method for identity-based auditing in a data processing system comprising a set of applications, at least first and second of the applications maintaining distinct identity registries, comprising:
   upon receipt of a request at a first application, the request being associated with a user identity, executing a remote access login to a second application using a system account while passing in the user identity;
   performing an operation using the second application; and
   writing an audit log entry associated with the second application, the audit log entry being associated with the user identity.

2. The method as described in claim 1 wherein the request is a request to perform a management operation on a resource associated with the second application.

3. The method as described in claim 1 wherein the remote access login is performed via one of: SSH and RXA.

4. The method as described in claim 1 further including retrieving the audit log entry to the first application.

5. The method as described in claim 4 further including presenting audit data including the retrieved audit log entry.

6. The method as described in claim 5 wherein the audit data is correlated using the user identity.

7. The method as described in claim 1 further including performing a role-based access check upon receipt of the request.

8. The method as described in claim 1 wherein the user identity is used in an authentication or authorization operation.

9. An apparatus for identity-based auditing in a data processing system comprising a set of applications, at least first and second of the applications maintaining distinct identity registries, comprising:
   a processor;
   a computer memory holding computer program instructions which when executed by the processor perform a method comprising:
      upon receipt of a request at a first application, the request being associated with a user identity, executing a remote access login to a second application using a system account while passing in the user identity;
      performing an operation using the second application; and
      writing an audit log entry associated with the second application, the audit log entry being associated with the user identity.

10. The apparatus as described in claim 9 wherein the request is a request to perform a management operation on a resource associated with the second application.

11. The apparatus as described in claim 9 wherein the remote access login is performed via one of: SSH and RXA.

12. The apparatus as described in claim 9 wherein the method further includes retrieving the audit log entry to the first application.

13. The apparatus as described in claim 12 wherein the method further includes presenting audit data including the retrieved audit log entry.

14. The apparatus as described in claim 13 wherein the audit data is correlated using the user identity.

15. The apparatus as described in claim 9 wherein the method further includes performing a role-based access check upon receipt of the request.

16. The apparatus as described in claim 9 wherein the user identity is used in an authentication or authorization operation.

17. A computer program product in a non-transitory computer readable medium for use in a data processing system for identity-based auditing, the computer program product holding computer program instructions which when executed by the data processing system perform a method comprising:
   upon receipt of a request at a first application, the request being associated with a user identity, executing a remote access login to a second application using a system account while passing in the user identity;
   performing an operation using the second application; and
   writing an audit log entry associated with the second application, the audit log entry being associated with the user identity.

18. The computer program product as described in claim 17 wherein the request is a request to perform a management operation on a resource associated with the second application.

19. The computer program product as described in claim 17 wherein the remote access login is performed via one of: SSH and RXA.

20. The computer program product as described in claim 17 wherein the method further includes retrieving the audit log entry to the first application.

21. The computer program product as described in claim 20 wherein the method further includes presenting audit data including the retrieved audit log entry.

22. The computer program product as described in claim 21 wherein the audit data is correlated using the user identity.

23. The computer program product as described in claim 17 wherein the method further includes performing a role-based access check upon receipt of the request.

24. The computer program product as described in claim 17 wherein the user identity is used in an authentication or authorization operation.

* * * * *